Aug. 23, 1966     C. J. WEINGARTNER     3,268,434
APPARATUS FOR ELECTROLYTIC MACHINING
Filed May 11, 1962     5 Sheets-Sheet 1
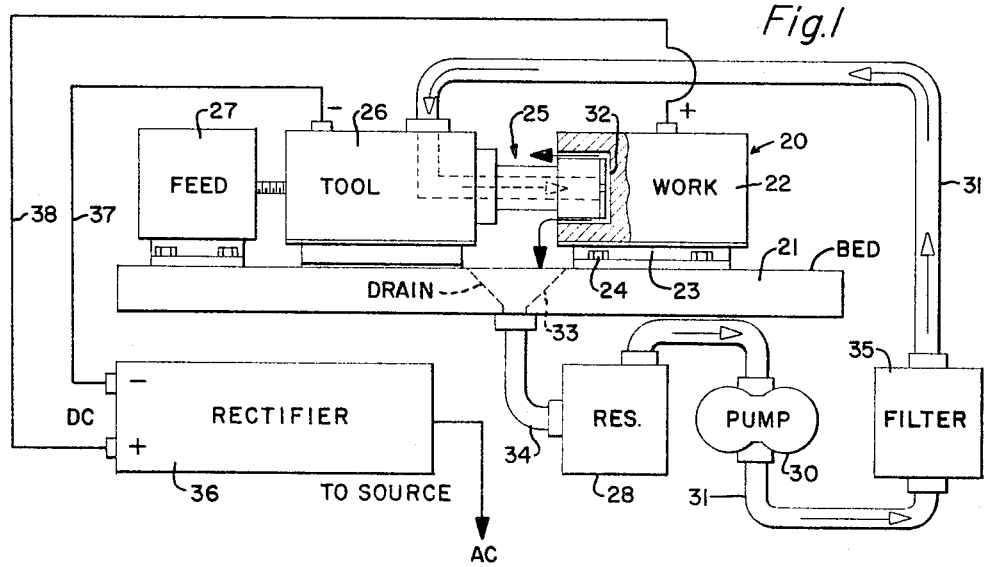
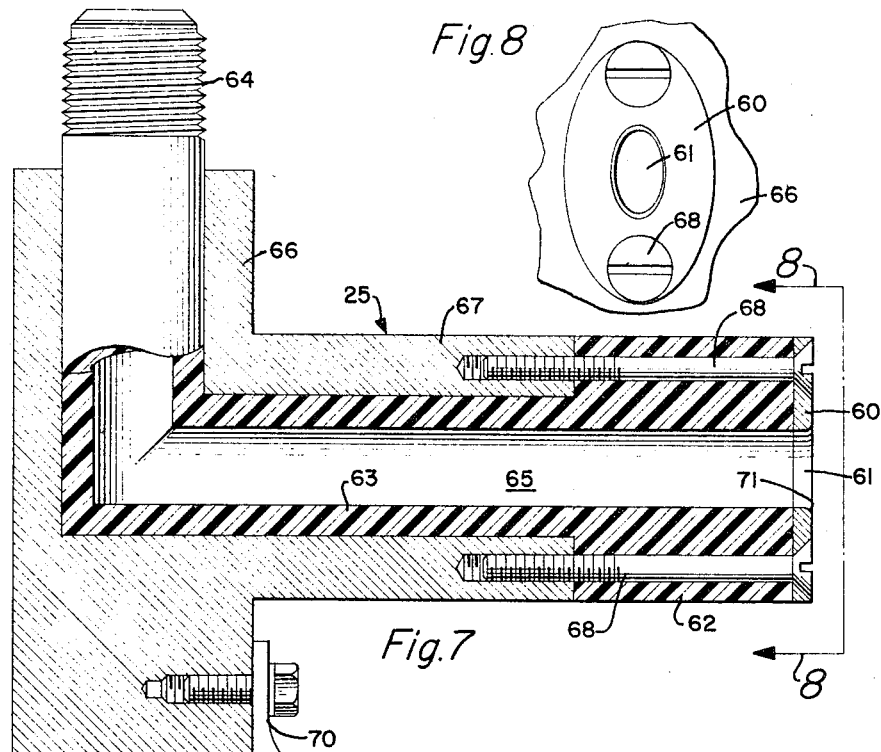
INVENTOR.
CARL J. WEINGARTNER
BY *Francis O. Beber*
ATTORNEY Aug. 23, 1966
C. J. WEINGARTNER
3,268,434
APPARATUS FOR ELECTROLYTIC MACHINING
Filed May 11, 1962
5 Sheets-Sheet 2
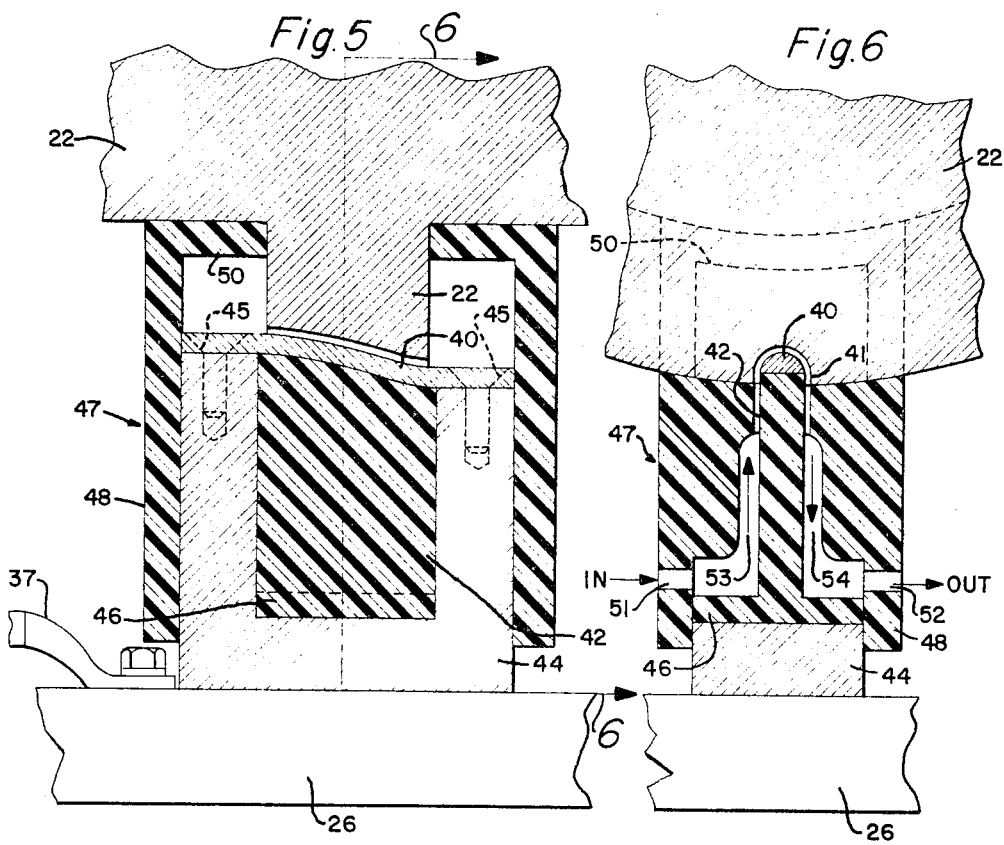
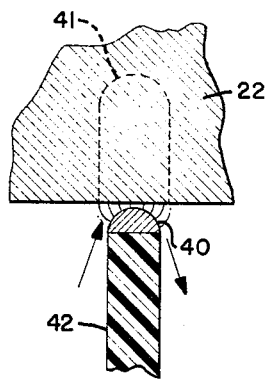
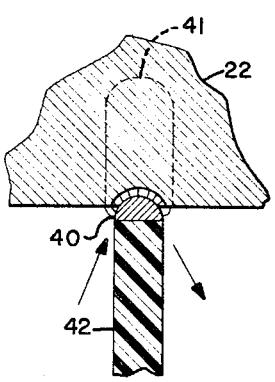
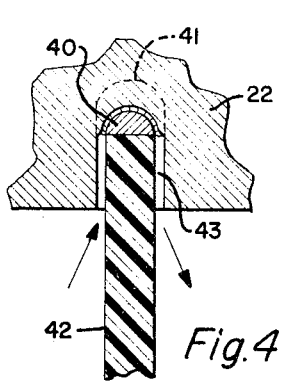
INVENTOR.
CARL J. WEINGARTNER
BY
*Francis H. Bebee*
ATTORNEY Aug. 23, 1966   C. J. WEINGARTNER   3,268,434
APPARATUS FOR ELECTROLYTIC MACHINING
Filed May 11, 1962   5 Sheets-Sheet 3
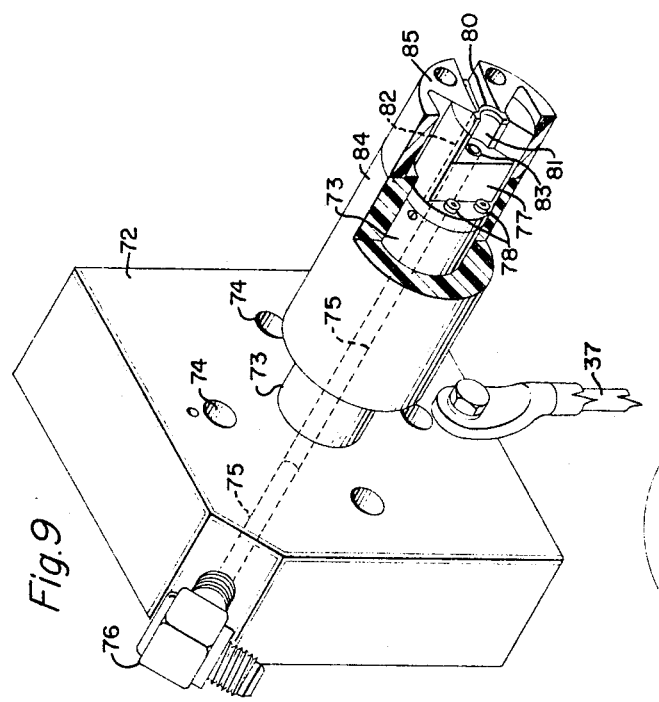
INVENTOR
CARL J. WEINGARTNER
BY
Francis H. Bebee
ATTORNEY Aug. 23, 1966    C. J. WEINGARTNER    3,268,434
APPARATUS FOR ELECTROLYTIC MACHINING
Filed May 11, 1962    5 Sheets-Sheet 4

INVENTOR.
CARL J. WEINGARTNER
BY
Francis H. Bebee
ATTORNEY

Aug. 23, 1966     C. J. WEINGARTNER     3,268,434
APPARATUS FOR ELECTROLYTIC MACHINING
Filed May 11, 1962     5 Sheets-Sheet 5
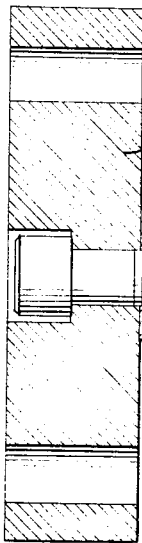
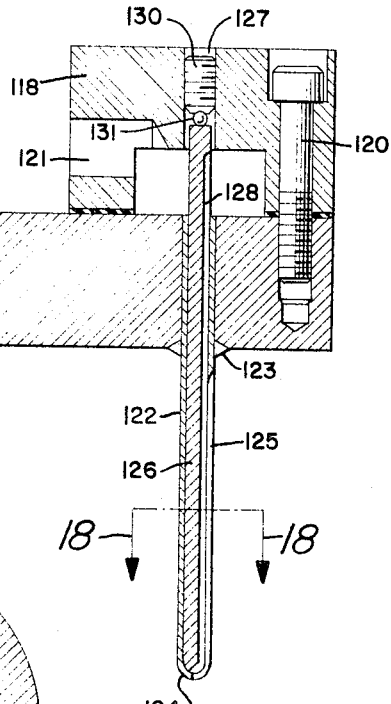
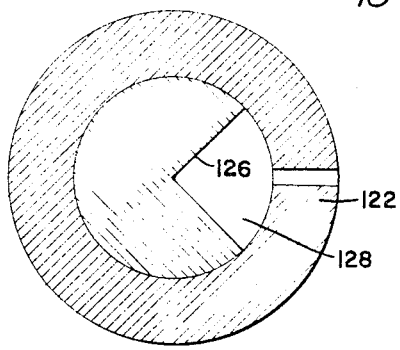
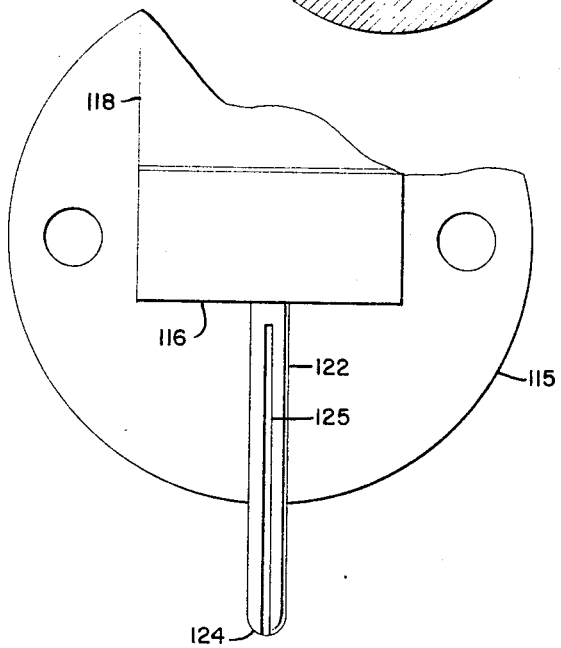
INVENTOR.
CARL J. WEINGARTNER
BY
Francis W. Beebee
ATTORNEY United States Patent Office 3,268,434
Patented August 23, 1966

3,268,434
APPARATUS FOR ELECTROLYTIC MACHINING
Carl J. Weingartner, Phoenix, Ariz., assignor to The Garrett Corporation, Los Angeles, Calif., a corporation of California
Filed May 11, 1962, Ser. No. 194,085
4 Claims. (Cl. 204—224)

This invention relates to the art of electrolytic machining, and aims to provide an improved method of and apparatus for such machining in which the insulating coatings usually required on the electrode may be eliminated and the process carried out at greater speeds and with greater accuracy than has been possible heretofore. The invention especially involves an electrolytic machining process which is particularly adaptable for the manufacture of turbine wheels and turbine wheel blades.

In recent years, metal removal by the reverse electroplating process has been quite widely practiced, and developed to the point where complicated shapes can now be accurately and rapidly produced. One such electrolytic machining process makes use of specially shaped cathodes which are housed within insulator tubes that are held against the metal being cut by means of packing rings which provide a fluid seal and permit the electrolyte to be circulated back to the pumping means through the insulator tubes. This process and apparatus are rather complicated and also slow because it is not possible to circulate the electrolyte in large enough quantities to permit the high current densities and high concentration of ions at the cutting area which would effect faster metal removal. Another process that is gaining acceptance rapidly does not require the insulator tubes and packing rings, but the specially shaped cathodes are coated on the outside with insulating coatings for the purpose of preventing further undesired electrolytic action on portions of the metal that have already been cut to the desired shape. In all cases where insulating coatings have been employed, it has been impossible to prevent some coating failure, and where failures occur, current flow will take place with resulting imperfections in the final cuts.

It has now been discovered that the coatings, special insulators and packing rings, used in prior electrolytic machining processes, may be eliminated and accurate and rapid metal removal effected by an improved electrolytic machining process in which a specially shaped, relatively thin electrically conducting cathode is advanced toward the metal to be cut while current is supplied thereto, and an electrolyte is flowed at high pressure over the forward surface of such cathode. Then, as the cathode advances, the space immediately behind it is filled with a wall of electrically insulating material so as to prevent current flow between the rearward surface of the cathode and the forming side walls of the cut. In this improved process, the forward surface of the advancing cathode is maintained at a distance of 0.001 to 0.002 inch from the metal to be cut, and the side edges are allowed a clearance of about 0.020 inch. The electrolyte is supplied to this narrow gap or space at pressures of from 200 to 250 p.s.i. so that current densities up to 10,000 amperes per square inch may be obtained. In this way the ion concentrations obtained in the gap between the advancing electrically conducting cathode and the metal to be cut are sufficiently high that exceedingly rapid metal removal is achieved.

Accordingly, one of the principal objects of the present invention is to provide an improved method of and apparatus for electrolytic machining which is both rapid and accurate, and which obviates the difficulties encountered with prior electrolytic processes and equipment.

Another object of the invention is to provide a method of and apparatus for electrolytic machining which employs a thin metallic electrically conducting cathode having a contour substantially the same as the contour of the cut to be made, and, as said cathode advances into the metal to be cut, following said cathode with an electrically insulating wall that may be either a solid plastic support for the thin metallic cathode or an air wall created by the fluid dynamics of the electrolyte as it flows over the surface of the cathode and along the walls of the cut being made.

A further object of the invention is to provide an electrolytic machining process in which current densities up to 10,000 amperes per square inch may be employed for rapid metal removal.

Still another object of the invention is to provide an electrolytic machining process in which the face of the electrically conducting cathode is maintained at a distance of from 0.001 to 0.002 inch from the metal to be cut and the side edges of the electrode produce a clearance of 0.020 to 0.040 inch from the walls of the cut.

It is a further object of the invention to provide an electrolytic machining process in which the electrolyte is supplied to the electrically conducting cathode at pressures of from 200 to 250 p.s.i., and in a path that permits it to flow freely over the forward advancing surface of the cathode to be collected at any convenient place beneath the cutting operation.

Another object of the invention is to provide an electrolytic machining process in which the cathode comprises an electrically conducting metal tube maintained under tension and provided with a slot in the surface thereof.

Another object of the invention is to provide an electrolytic machining process particularly adaptable for making turbine wheels wherein a plurality of electrodes are spaced at predetermined intervals around the periphery of the wheel to be cut and simultaneously advanced into the surface to be cut as electrolyte and current are supplied thereto.

The above and other objects of the invention will be apparent from the following more detailed description and the accompanying drawings, in which:

FIG. 1 is a schematic elevational view of one form of apparatus embodying certain features of the invention, and useful in the practice of the improved electrolytic machining method;

FIGS. 2, 3 and 4 are fragmentary schematic sectional views showing three stages of the progress of an electrode into a metal workpiece during a machining operation;

FIG. 5 is a side elevational view, partly in section, of one form of apparatus for making cuts in the manner illustrated in FIGS. 2, 3 and 4;

FIG. 6 is a vertical sectional view taken along the line 6—6 of FIG. 5;

FIG. 7 is a sectional view of another form of electrode that may be used in practicing the invention;

FIG. 8 is an end elevational view in the plane 8—8 shown in FIG. 7;

FIG. 9 is an isometric view, with portions cut away and in section, showing a special cutting tool for use in forming turbine wheel blades;

FIG. 10 is an end view of the cutting tool shown in FIG. 9, showing how it and a second cutting tool may be positioned with respect to the metal being cut;

FIG. 11 is a vertical sectional view taken along the line 11—11 of FIG. 10;

FIG. 12 is an isometric view, similar to FIG. 9 showing still another form of cutting tool for making certain portions of a turbine wheel blade;

FIG. 17 is a vertical sectional view of another form of apparatus and cutting electrode for making cuts according to the method illustrated in FIG. 15 and 16;

FIG. 18 is a horizontal sectional view taken along the line 18—18 of FIG. 17; and FIG. 19 is an end elevational view of the cutting apparatus shown in FIG. 17.

Figure 13:
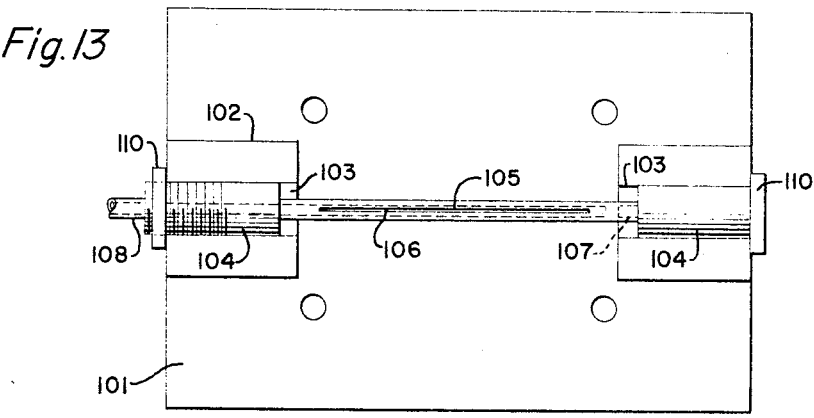
FIGS. 13 and 14 are side elevational and top plan views, respectively, of another form of electrode for making smooth-walled, straight cuts.

As used herein, the term "electrolytic machining" means the process of removing metal by electric current flow in which the metal to be cut acts as the anode, the electric current of a density of up to 10,000 amperes per square inch, but preferably between 500 and 5,000 amperes per square inch, is supplied to a cathode which is made of a copper tungsten alloy and shaped approximately the same as the desired cut, and a suitable liquid electrolyte such as NaCl solutions and electrochemical compositions now commercially available is flowed over the surface of the cathode to the metal to produce the desired current flow. Basic laws of physics govern the process and indicate that the amount of metal removed from the anode is directly proportional to the current flow. The term "electrolytic machining" is intended to be synonymous with electrochemical machining or grinding and anodic machining. This process should not be confused, however, with electrodischarge or spark-arc machining methods wherein heat is generated at the point of metal removal and the electrode is reciprocated during operation.

Referring now to the drawing, and particularly to FIG. 1 wherein one form of apparatus for practicing electrolytic machining is illustrated somewhat diagrammatically, it will be noted that an electrolytic machining apparatus 20 may comprise a table or bed 21 for supporting a piece of metal 22 which is the workpiece to be cut and constitutes the anode in an electric circuit. The metal workpiece 22 which may be any suitable commercially available metal, titanium 6A14V and Waspaloy having been found satisfactory, may be supported in any convenient manner on and suitably insulated from the bed 21, such as by a bracket or holder 23 secured to the bed by suitable bolts 24. A tool or electrode 25, mounted on or secured to a support 26 also properly insulated from the bed 21, provides the cathode in the electric circuit and is arranged to be advanced toward the work at a predetermined speed by a suitable feeding mechanism 27 cooperating with the cathode holder or support 26. Electrolyte, such as salt water solution, is fed from a reservoir 28 at high pressures of from 200 to 250 p.s.i. by a pump 30 through a conduit 31 to the electrode 25 so as to produce a rapid flow in and through a narrow gap 32 between the cathode and anode, as will be described in more detail hereinafter. As indicated by the arrows in FIG. 1, the electrolyte flows from the gap 32 around the electrode 25 in contact with the surface of the metal being cut, and is collected in a drain 33 mounted in the bed 21 and connected by a drainpipe 34 with the reservoir 28. Any sediment in the electrolyte, as a result of the electrolytic process, may be removed by a suitable filter 35 which is placed between the pump 30 and pipe 31 for feeding the filtered electrolyte back to the electrode 25, thus providing complete circulation in the cutting process. Electric current in the desired high amperage, which will produce densities as high as 10,000 amperes per square inch in the gap 32, may be provided from any suitable source and fed to a rectifier 36 from which a line 37 leads from the negative pole to the cathode-electrode 25. A conductor 38 connects the positive pole of the rectifier with the anode or metal 22 to be cut.

According to the present invention, an improved cutting method is provided in which the need for packing rings, insulator tubes, and special insulating coatings is eliminated. This is accomplished by following up the advancing cathode, which is specially designed and shaped, with a wall of insulating material having substantially the same cross-sectional area or contour as that of the advancing cathode. Three phases of this cutting process, with one particular type of electrode and insulating wall, are illustrated in FIGS. 2, 3 and 4. Starting of the cut takes place somewhat as schematically shown in FIG. 2 where a cathode electrode 40, in the form of a thin bar of metal substantially arcuate in vertical section, is positioned immediately adjacent the metal 22 into which a cut 41 is to be made. As mentioned above, the forward arcuate surface of the electrode 40 is positioned to provide a very narrow gap between said surface and the surface of the metal to be cut. The depth or width of the gap at the narrowest point or line is from 0.001 to 0.002 inch, and such a narrow gap has been found most suitable for providing the desired high ion concentration between the two electrodes and high current densities desired for metal removal at maximum speed. Electrolyte is flowed over the forward surface of the electrode 40 from the left (FIG. 2) to the right, as indicated by the arrows. Such flow of electrolyte and the electrolytic action produced thereby will cause metal to be removed so that as the electrode 40 is advanced, the cut 41 will begin to form, as indicated in FIG. 3. Current flow or lines of flux between the advancing cathode and the metal being cut are indicated by the lightly curved lines in the figures.

As the electrode 40 advances into the metal, as indicated in FIG. 4, it would be possible for current to flow from the rearward side thereof to the walls of the cut being formed, and with the free-flowing electrolyte, this would cause further metal to be removed from the sides of the cut thereby destroying the uniformity of the straight walls and otherwise detracting from accurate control of the operation. It has been found that this may be prevented by following up the electrode 40 with a wall 42 of a special electrically insulating material having substantially the same cross-sectional area or contour as the rearward side of the advancing electrode 40, so as to fill substantially the cut as it is being produced but nevertheless still allow narrow passages 43 for the flow of the electrolyte, as indicated by the arrows in FIG. 4. The insulating material used for the wall 42 may take many forms, and consist of different suitable materials depending upon the size and shape of the electrode 40 and the particular type of cut being made. In several of the forms of construction shown in the drawings, the electrically insulating wall 42 is composed of an insulating plastic material, such as nylon and certain phenolics, which, in addition to performing the electrically insulating function, also provides a supporting structure for the electrode itself and acts as part of a guide or duct for the electrolyte.

In FIGS. 5 and 6, one form of apparatus or device for supporting or carrying the electrode 40 is shown as comprising a substantially U-shaped frame or support 44 which may be secured in any convenient manner to the holder or tool 26. This frame member 44 is constructed of metal or other conducting material and supports the thin conducting member 40 at the upper ends of the U-shaped arms, having said conductor member 40 secured thereto by screws or rivets 45. Current for the electrolytic process, conducted to the tool 26 by the conductor 37, feeds to the electrode 40 through the U-shaped frame 44. The space between the arms of the U-shaped support 44 provides a housing or holder for the insulating wall 42 which follows in the path of the electrode 40, and is shown as comprising a horizontally disposed base 46 which rests upon the bottom of the U-shaped frame.

Electrolyte may be supplied to the narrow gap between the advancing forward surface of the cathode-electrode bar 40 and the work 22 in any convenient manner, such as by positioning the conduit or tube 31 so that the electrolyte flows directly into the working area.

It has been found helpful, however, to confine the fluid more effectively near the working area because of the high pressures employed, and this may be accomplished by means of a suitably shaped housing 47 having side walls 48 fitting around the U-shaped support 44, and end walls 50 which may bear against the surface of the work adjacent the area being cut. The housing 47 is provided with a fluid inlet 51, to which the conduit 31 may be connected, and an outlet 52 leading to the drain 33. The inlet 51 is shaped to form an internal passage 53 leading to one side of the cathode-electrode 40 so that the fluid may flow thereover and be returned to the outlet 52 through a passage 54 on the opposite side of the insulating wall 42. It will be understood that as the electrode supporting member 26 moves the electrode 40 toward the work during the advance of the cutting process, the housing member 47 will remain stationary, and the U-shaped frame or support 44, electrode 40, and electrically insulating wall 42 will move within said housing 47 as the cut advances.

Another form of the electrode 25 is shown in FIGS. 7 and 8 as comprising a relatively thin, elliptical-shaped, metal bar or member 60 which has a centrally disposed elliptical opening 61 therein. This electrode bar 60 is positioned on an enlarged end 62 having the same cross-sectional area or contour as the member 60 and is formed on the outer end of an elbow-shaped plastic or insulator tube 63 having a threaded outer end or nipple 64. Tube 63 provides a passage 65, preferably corresponding in shape to the opening 61, so that when the threaded end 64 is connected to the conduit 31, electrolyte may be flowed therethrough, as will be described below. Support for the tube 63 may be provided by a hub-shaped base member 66 having an annular collar 67 which abuts the enlarged portion 62 of the tube 63, so that said tube may be attached to the collar by elongated screws 68 which also serve to hold the electrode 60 on the end of the enlarged portion 62. If the conductor 37 is connected to a lug 70 attached to the support 66, current will flow to the electrode 60 through the annular collar 67 and screws 68. It has been found desirable to gently curve the annular shoulder 71 of the elliptical openings 61 so that when said electrode is in operating position with respect to the metal being cut, the electrolyte will flow smoothly from the tube 65 into the very narrow gap between the forward surface of the electrode 60 and the surface of the work being cut.

One specific form of cathode-electrode, designed particularly for the cutting of turbine wheel blades is shown in FIG. 9 and its method of operation illustrated in FIGS. 10 and 11. The construction shown includes the same basic elements and method of operation described above in connection with FIGS. 5 and 6, and comprises a metallic base 72 having a centrally disposed, vertically arranged, cylindrical supporting pipe 73 suitably mounted therein. The base 72 includes openings 74, through which it may be attached to the tool member 26, and internal passages 75 leading from a suitable fitting 76 to the central cylindrical support 73, through which electrolyte may be supplied, as will hereinafter appear. Provision may also be made for connecting the base 72 to the power conductor 37, as illustrated. A specially shaped plastic or electrically insulating support 77 is attached to the outer end of the cylindrical member 73 by screws 78, and provides a suitable structure for holding a specially shaped electrode 80. This electrode comprises a thin metal bar having substantially the same contour as that of the cut to be made to produce the turbine blades, and is backed-up by an electrically insulating wall 81. The wall 81 extends outwardly from and forms part of the specially shaped support 77, and has the same cross-sectional shape and area as said electrode 80. Conductors 82, in the form of elongated pin-like wires or members, extend from the outer ends of the electrode 80 through the special plastic support 77 for attachment to the conductor supporting cylinder 73, so that current supplied to the base will be properly fed to the electrode. A passage 83, connecting with the passage 75 in the base 72 and cylindrical support 73, is arranged to feed electrolyte solution up one side of the insulating wall 81 adjacent the concave side of the arcuate electrode 80. In order to confine the electrolyte initially to the proper working area, the cylindrical support 73, special plastic insulating member 77, insulating wall 81, and electrode 80 may be encased in a slidable, electrically insulating outer housing 84. As best shown in FIG. 1, this outer housing 84 is provided with an end wall 85 having a suitably shaped opening 86 therein through which the electrode 80 may pass, and a passage 87 for directing the electrolyte away from the working zone.

In FIGS. 10 and 11, the special cathode-electrode just described is shown in operating position with respect to the metal 22 which is to be cut with the special shapes for turbine wheel blades. A plurality of cuts 88 have been made in the workpiece 22 (in this instance, one at a time) by advancing the electrode into the work, or in an upward direction as shown in FIG. 11. During such movement, the housing 84 remains stationary, pressed against the work surface, whereas the electrode supporting structure 73 moves relative thereto, advancing the electrode 80 into the metal as the electrolyte flows, as indicated by the arrows, from the passage 83 along the sides of the cut, over the electrode 80, down the other side of the cut, and out through the outlet 87. It will be noted that a second electrode 25X, indicated in dot-and-dash lines in FIG. 10, is positioned on the workpiece 22 so that a plurality of cuts 88 may be made at one time, if desired; and by placing four such electrodes at 90 degree intervals, or six at 60 degree intervals, it would be possible to form the complete turbine wheel very rapidly. Portions of the showing in FIG. 11 are obviously on an exaggerated scale since the clearance on each side of the insulating wall 81 is about 0.020 inch, and the gap between the advancing forward surface of the electrode 80 and the metal being cut is only 0.001 inch.

Another form of cathode-electrode, embodying the basic principles of this invention, is illustrated in FIG. 12, and comprises a metal base 90 having a tubular supporting member 91 centrally secured thereto. Openings 92 are provided in the base for the reception of suitable bolts to attach it to the tool support 26 (FIG. 1), and internal passages are formed in both base and support for the reception of a plastic inlet pipe 93 for feeding the electrolyte to the tool. The outer end of the tubular support 91 has suitable supporting shoulders 94 for the reception of a specially shaped, thin, metallic electrode member 95 secured thereto in any convenient manner. As in the FIG. 9 construction, the cross-sectional shape of the thin electrode 95 determines the shape of the cut that will be made in the metal workpiece 22 when the electrode is used in the FIG. 1 apparatus. In this instance, however, the thin electrode 95 is provided with an opening 96 which leads to and registers with a similarly shaped passage 97 provided in a plastic core 98, housed within the tubular support 91, and having fluid connection with the inlet pipe 93. The outer end of the plastic core 98 is shaped to provide an insulating wall 100 which has substantially the same contour or cross-sectional shape as the electrode 95. Electric power is supplied to the base 90 by connecting it with the conductor 37 as in the other forms of the invention described above.

In the FIG. 12 form of the invention, the electrolyte flows out through the opening 96 and over the forward surfaces of the advancing electrode 95, and said electrode is followed by the electrically insulating wall 100 to prevent current flow between the rearward surface of said electrode and the forming side walls of the cut. It will be understood that this construction does not require an outer casing or retaining housing similar to the casing 84 in the FIG. 9 construction, since flow of the electrolyte over the advancing surfaces is assured by feeding it through the internal passages 97 and 96 from the inlet 93.

Figure 14:
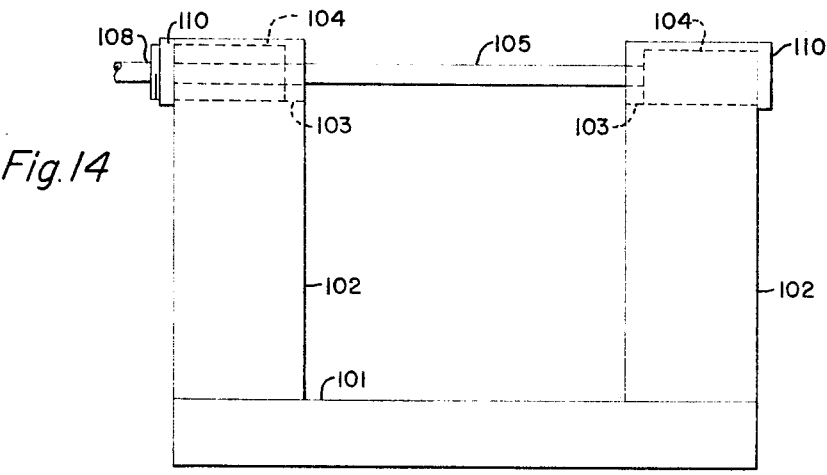
Figures 15, 16:
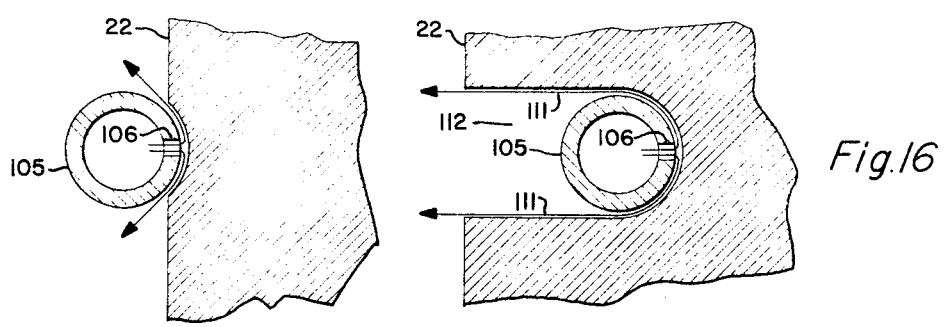
FIGS. 15 and 16 are fragmentary sectional views illustrating the electrolyte path and cutting action obtained in the apparatus shown in FIGS. 13 and 14.

In the forms of the invention thus far described, the thin metal bar, constituting the cathode-electrode, is followed-up in its advancing movement into the metal being cut by a substantially solid wall of electrically insulating material which consists of a suitable plastic or other electrically insulating solid. A modification of this principle of operation consists in creating an electrically insulating wall behind the cathode-electrode by means of the fluid dynamics of the electrolyte flowing over the forward surface of said electrode. A cutting tool or cathode-electrode adapted to operate in this manner and specifically designed for making straight cuts through a metal workpiece is shown in FIGS. 13 and 14, and the principle of operating therewith is illustrated in FIGS. 15 and 16. This modified cathode-electrode, as in the other forms of the invention, comprises a base 101 which is adapted to be connected to or mounted upon the tool 26 shown in FIG. 1 and includes a pair of spaced supporting yokes 102 perpendicularly arranged with respect to the base 101. Channels 103 are formed in the outer ends of the yokes 102 for the reception of slidable holders 104 which support and hold a tubular electrode 105. The electrode 105 is provided with an elongated, narrow slot or opening 106 which extends longitudinally along the surface between the perpendicular yokes 102. One end of the electrode 105 is plugged at 107 and the other end is provided with a suitable fitting 108 for connection to the electrolyte supply pipe 31. To provide effective rigidity for the electrode member 105 during operation, retaining collars 110 may be threaded on the tube 105 or the slidable holders 104, so that, upon tightening, the tubular electrode 105 will be placed under tension.

During operation, when electrolyte is supplied to the electrode 105, so that it is forced out under pressure through the slot 106 and said slot is positioned adjacent the metal 22 or work to be cut, said fluid will be ejected to either side of the slot 106, as shown in FIG. 15. When the cutting progresses to the point that side walls start to be formed in the cut, as shown in FIG. 16, it has been discovered that with proper design of the tubular shape of the electrode, and close control of the high pressure under which the electrolyte is ejected into the cut, said fluid may be caused to flow in a thin wall or stream against the walls of the cut. There are thus formed sheets 111 of electrolytic fluid which flow along the walls of the cut and thereby define an insulating wall 112 filling the space between said sheets 111 and immediately behind the rearward surface of the advancing electrode 106. In this instance, the insulating material consists of air but it nevertheless has been found to provide an effective insulating wall preventing any current flow between the rearward surface of the electrode 106 and the walls of the cut.

One additional form of the invention operating on the same principle as that just described is shown in FIGS. 17 to 19, and comprises a base member 115 having a perpendicularly disposed arm 116 attached thereto by means of bolts 117. The base 115 is adapted to be attached to the tool support 26 shown in FIG. 1 and supplied with electric current as in the other forms of the invention. At the outer end of the arm 116 a supporting block 118 is provided and attached to said arm 116 by bolts 120. The block 118 includes passages 121 which may be connected to the source of electrolytic fluid through pipe 31, so that electrolyte may be supplied to a downwardly extending, tubular electrode 122 positioned in a suitable opening provided in the outer end of the support 116 and secured thereto in any convenient manner, such as by welding shown at 123. Electrode tube 122 is closed at its lower end 124, and provided with an elongated slot 125 on the forward side thereof so that, when electrolyte is supplied through the passages 121 into the tube 122, it will be ejected through the slot 125 against the work to be cut. Cutting then proceeds as described above in connection with FIGS. 15 and 16.

It is also desirable to maintain the electrode tube 122 effectively rigid during the cutting operation, and this may be accomplished by means of an internal reinforcing rod or member 126 which abuts against the lower end 124 of the electrode tube and extends upwardly into an aligned passage 127 in the block 118. This reinforcing rod may be formed with a suitable longitudinal groove 128 which is positioned adjacent the slot 125 so as to provide a passage for the electrolyte fluid. The rod 126 is held under adjustable compression within the tube by means of a set screw 130, pressing against a bearing 131 positioned at the top of the rod. It will be understood that in addition to providing a reinforcing structure for the tube 122, said rod 126 when pressed against the lower inner end of the tube effectively places the tube under tension. This has been found to provide the necessary rigidity during the cutting operation.

Although this form of the invention and that shown in FIGS. 13 and 14 are particularly adapted for making straight cuts through a piece of metal, it will be understood that by moving the workpiece 22 through a curved path, for example, and maintaining the electrode stationary, it would be possible to produce cuts with a predetermined linear curvature. It will also be understood that where cylindrical shapes are shown, as in the housing 84 in FIG. 9, any other desired shape may be employed; for example, the FIGS. 9 and 12 constructions might be wedge-shaped so that several electrodes could be positioned for simultaneous cutting action adjacent one another around the periphery of a wheel being cut, as mentioned above and indicated in FIG. 10.

I claim:

1. In the device for use in electrolytic machining of cuts of a predetermined shape in a metal workpiece, the device including means for holding the workpiece, an electrode tool for machining cuts in the workpiece, means for advancing the said electrode tool relative to the workpiece and for maintaining a gap therebetween thereby defining a working space, means for rapidly circulating an electrolyte through said working space, and a source of direct current electrically connected to the workpiece and said electrode tool whereby the workpiece and said electrode tool function as an anode and a cathode, respectively; the improvement wherein said means for circulating electrolyte includes a housing of electrically insulating material, said housing including wall means defining a passage terminating in an opening in one end of said housing, said one end adapted to engage the workpiece in liquid sealing relationship, and wherein said electrode tool includes a body of electrically insulating material slidably mounted within said passage of said housing, a relatively thin metallic element mounted on one end of said body of insulating material, said element having a working face substantially coextensive with the cut to be made in the workpiece, said working face adapted to project through said opening in said housing, said body of insulating material being substantially coextensive in cross section with, and having a contour substantially conforming to, said working face and the cut to be made, said body of insulating material, said metallic element and said housing defining electrolyte inlet and outlet means in fluid communication with said working space, and means for conducting current to said metallic member.

2. In a device for use in electrolytic machining of cuts of a predetermined shape in a metal workpiece, the device including means for holding the workpiece, an electrode tool for machining cuts in the workpiece, means for advancing said electrode tool relative to the workpiece and for maintaining a gap therebetween thereby defining a working space, means for rapidly circulating an electrolyte through said working space, and a source of direct current electrically connected to the workpiece and said electrode tool whereby the workpiece and said electrode tool function as an anode and a cathode, respectively; the improvement wherein said electrode tool includes a base having a passage therein, a supporting member mounted on said base, said supporting member having a passage therein communicating with the passage in said base, a relatively thin metallic element supported on said supporting member and having a central opening therein, said metallic element having a working face substantially coextensive with, and of the same contour as, the predetermined shape of the cuts to be made in the workpiece, a rigid body of electrically insulating material mounted between said metallic element and said supporting member, said body of insulating material having an electrolyte inlet passage therein communicating with the passage in said supporting member and the central opening in said metallic element, said body of insulating material being substantially coextensive in cross section with said metallic element and the predetermined shape of a cut to be made in the workpiece whereby electrolyte fed to the passage in said base may be directed through said working space over said working face of the metallic member, and means for conducting current to said metallic member, said means extending through said body of insulating material and being of a reduced cross section relative thereto.

3. In a device for use in electrolytic machining of cuts of a predetermined shape in a metal workpiece, the device including means for holding the workpiece, an electrode tool for machining cuts in the workpiece, means for advancing said electrode tool relative to the workpiece and for maintaining a gap therebetween thereby defining a working space, means for rapidly circulating an electrolyte through said working space, and a source of direct current electrically connected to the workpiece and said electrode tool whereby the workpiece and said electrode tool function as an anode and a cathode, respectively; the improvement wherein said electrode tool includes a base having a passage therein, a supporting member supported on said base and having a passage therein communicating with the passage in said base, a relatively thin metallic element supported on said supporting member and having a central opening therein, said metallic element having a working face substantially coextensive with, and of the same contour as, the predetermined shape of the cut to be made in the workpiece, said metallic element including laterally extending portions fixed to said working face, a rigid body of electrically insulating material mounted between said metallic element and said supporting member, said body of insulating material having an electrolyte inlet passage therein communicating with the passage in said supporting member and the central opening in said metallic element, said body of insulating material being substantially coextensive in cross section with said metallic element and the predetermined shape of a cut to be made in the workpiece whereby electrolyte fed to the passage in the base may be flowed through said working space over said working face of said metallic element, and means for conducting current to said metallic element, said means being laterally displaced from said body of insulating material and electrically connected to said laterally extending portions of said metallic element.

4. In a device for use in electrolytic machining of cuts of a predetermined shape in a metal workpiece, the device including means for holding the workpiece, an electrode tool for machining cuts in the workpiece, means for causing converging relative movement between said electrode tool and the workpiece and for maintaining a gap therebetween thereby defining a working space, means for circulating an electrolyte through said working space, and a source of direct current electrically connected to the workpiece and said electrode tool whereby the workpiece and said electrode tool function as an anode and a cathode, respectively; the improvement wherein said electrode tool includes a base, a supporting member mounted on said base, a relatively thin metallic element supported on said supporting member, said metallic element having a working face substantially coextensive with, and of the same contour as, the predetermined shaped of the cuts to be made in the workpiece, a rigid body of electrically insulating material mounted between and holding said metallic element spaced and electrically insulated from said supporting member, said body of insulating material being substantially coextensive in cross section with the contour of said metallic element and the predetermined shape of a cut to be made in the workpiece, means forming inlet and outlet passages communicating with said electrolyte circulating means and leading, respectively, to and from spaced portions of said metallic member whereby electrolyte fluid may be directed through said working space over said working face of the metallic member, and means for conducting current to said metallic member.

References Cited by the Examiner
UNITED STATES PATENTS

| 2,844,531 | 7/1958 | Prince | 204—143 |
| 3,019,178 | 1/1962 | Williams | 204—284 |
| 3,041,265 | 6/1962 | Williams | 204—284 |
| 3,058,895 | 10/1962 | Williams | 204—143 |
| 3,088,889 | 5/1963 | La Boda et al. | 204—143 |
| 3,095,364 | 6/1963 | Faust et al. | 204—143 |
| 3,120,482 | 2/1964 | Williams | 204—143 |
| 3,123,545 | 3/1964 | Williams | 204—224 |
| 3,182,007 | 5/1965 | Hutchinson et al. | 204—196 |

FOREIGN PATENTS 335,003  9/1930  Great Britain.

OTHER REFERENCES

Faust et al.: Iron Age, pp. 77–80, Nov. 3, 1960.
Gusev et al.: Nauka I Zhizn', "Electrical Working for Metals" (excerpted from pages 25 and 26), No. 12, 1954.

JOHN H. MACK, *Primary Examiner.*

R. GOOCH, A. MIHALEK, *Assistant Examiners.*